No. 730,926. Patented June 16, 1903.

UNITED STATES PATENT OFFICE.

MASATARO KOBAYASHI, OF ISE, WATARAIKORI, TAMARU-MACHI, JAPAN.

FILM FOR WRAPPING MEDICINES.

SPECIFICATION forming part of Letters Patent No. 730,926, dated June 16, 1903.

Application filed February 21, 1903. Serial No. 144,400½. (No specimens.)

*To all whom it may concern:*

Be it known that I, MASATARO KOBAYASHI, a subject of the Emperor of Japan, and a resident of Sada No. 938, Ise, Wataraikori, Tamaru-machi, Japan, have invented certain new and useful Improvements in Films for Wrapping Medicines, of which the following is a specification.

This invention relates to a wrapper for medicines, which is composed of a tender, soluble, filmy substance somewhat resembling paraffin, but composed of starch and isinglass or gelatin mixed in suitable proportions and boiled in water. When prepared, the thick fluid is spread with a brush over a smooth heated metallic plate. The coating is dried by the heat, detached from the plate, and then cut into a circular shape of about eight centimeters in diameter. This product is colorless, odorless, and translucent, with a rather shining luster, and so tender in consistence that when moistened by water it readily swells and softens like an extremely-smooth mucous membrane.

The object of the substance is to be used as a substitute for medicinal oblato and for wrapping medicines, either powders or pills, in order to prevent the medicines from imparting any disagreeable taste to the mouth or throat of a person taking them.

In manufacturing this substance first about five percentage of isinglass or gelatin is put in two hundred percentage of water and then boiled till the isinglass or gelatin is dissolved. Next the mixture of about five percentage of starch and one hundred percentage of water is poured into the solution, the latter being well stirred as the starch mixture is put in. The whole mixture is again boiled till it assumes the consistency of syrup. This solution is sifted through a hair-sieve to remove the dregs and is then carefully transferred over moderate heat in order to prevent the solution from cooling and coagulating. The solution is then spread with a brush over a smooth metallic plate previously heated over a fire. The coating when dried is peeled off and cut into suitable round disks.

This substance being entirely made of edible ingredients is not only harmless to the health, but also being perfectly pure in quality and easily soluble in saliva or gastric juice will not in the least injure the stomach and intestines after it is taken into the system. Moreover, the quality of the oblato hitherto used is very inconvenient for handling, as it is too brittle, and therefore easily broken in using. It is also liable to prove injurious to health, especially in wet seasons, when the oblato often becomes moldy. Sometimes several pieces of the oblato adhere together in one lump and render it useless. Again, in using the usual oblato it has to be dipped in water before it can be used to wrap medicine in. This dipping is an exceedingly-delicate affair, for when it is done in excess the oblato will collapse and be rendered useless, while when insufficiently dampened it may break. The substance of the present invention being soft and pliable in quality it is very convenient in handling and requires no dipping in water. It is also free from the danger of sticking together or becoming moldy, while its small capacity and capability of being easily bent or pressed together render the present invention highly convenient either for carrying or keeping. When the medicines are wrapped with this substance and the whole is put in water, it will soften, making it adapted to be easily taken even by infants or nervous patients without causing them any disagreeable feeling in the mouth or throat.

In using this substance first the medicine is placed on one of the disks and after folding up its edges put it into water and then taken with the water.

Having fully described my invention, what I claim, and desire to secure by Letters Patent, is—

A medicinal film composed of substantially equal parts of starch and gelatin.

In testimony whereof I affix my signature in presence of two witnesses.

MASATARO KOBAYASHI.

Witnesses:
MINAJI SEKI,
R. S. MILLER.